Sept. 15, 1925.
W. M. THOMAS
1,554,142
HEADLIGHT TURNING DEVICE
Filed Jan. 23, 1925
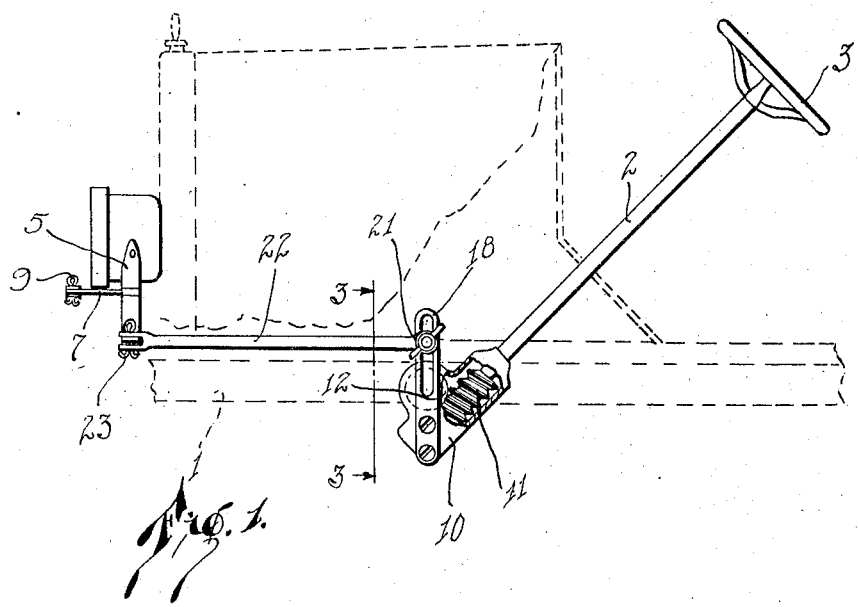
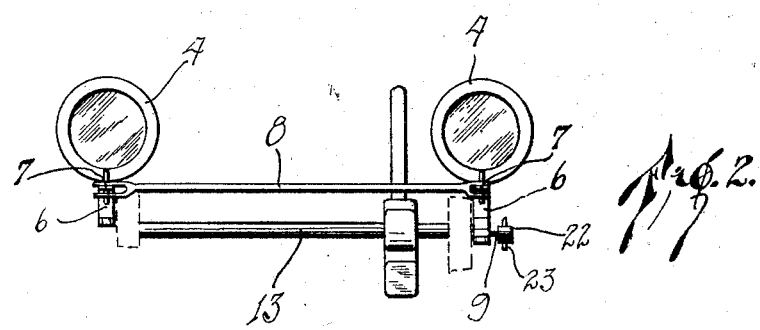
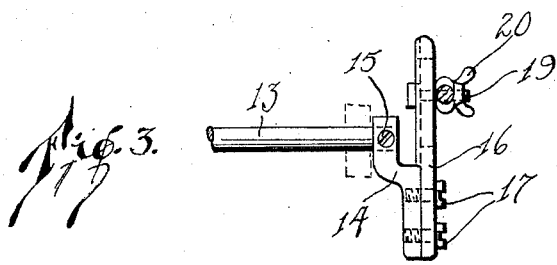
INVENTOR
WM. M. THOMAS
BY
ATTORNEYS Patented Sept. 15, 1925.

1,554,142

UNITED STATES PATENT OFFICE.

WILLIAM MATHIAS THOMAS, OF GARY, INDIANA.

HEADLIGHT-TURNING DEVICE.

Application filed January 23, 1925. Serial No. 4,287.

*To all whom it may concern:*

Be it known that I, WILLIAM M. THOMAS, a citizen of the United States, and a resident of the city of Gary, in the county of Lake and State of Indiana, have invented a new and useful Improvement in Headlight-Turning Devices, of which the following is a full, clear, and exact description.

My invention relates to improvements in headlight turning device and more particularly to that type of device intended for use with passenger motor vehicles, and it consists in the combinations, constructions, and arrangements herein described and claimed.

An object of my invention is to provide a device of the character described which turns the headlights of the motor vehicle in the direction which the driver intends that the vehicle shall move.

A further object of my invention is to provide a device of the character described in which particularly novel means is employed for adjusting the actuating mechanism for the headlights, whereby the movement of the headlights upon their vertical axes relative to the steering wheel may be determined and set at will.

A further object of my invention is to provide a device of the character described which is entirely automatic in operation and in which movement of each of the headlights is simultaneous and uniform.

Other objects and advantages will appear in the following specification, and the novel features of the invention will be particularly pointed out in the appended claim.

My invention is illustrated in the accompanying drawings forming part of this application, in which—

Figure 1 is a side elevation of an embodiment of my invention,

Figure 2 is a front elevation of the mechanism illustrated in Figure 1, and

Figure 3 is a view along the line 3—3 of Figure 1.

In carrying out my invention I make use of a motor vehicle having a chassis frame 1, a steering column 2, a steering wheel 3 connected with the steering column 2 for the purpose of operating the steering gear of the vehicle not shown, of ordinary construction.

In installing my improved headlight turning device, I remove the headlights 4 of the vehicle from their original supports and place them in brackets 5 which are pivotally mounted in vertical bearing members 6, and which may rotate upon their vertical axes.

Each of the brackets 5 has a forwardly extending arm 7. The arms 7 are connected with one another by a connecting rod 8 which is pivotally connected to the outermost end of the arms by the projection of pins 9 through aligned openings in the ends of the rod 8 and the arms 7. The rod 8 is of sufficient length as to cause the headlights 4 to throw parallel beams when in operation.

The bracket 5 adjacent to the left side of the vehicle, which is that side usually having the steering column, has a laterally extending arm 9.

A special casing 10 is employed for housing the lower end of the steering column 2 upon which a worm gear 11 of ordinary construction is carried. The worm gear 11 is connected with the steering mechanism of the vehicle. The casing 10 has a worm wheel 12 rotatably mounted therein in mesh with the worm gear 11 and having its axis transverse to the axis of the column 2. The worm wheel 12 is carried upon a shaft 13 which is rotatably mounted upon the chassis frame 1.

With reference now to Figure 3, it will be noted that a radially extending arm 14 is secured to the shaft 13 by means of an adjusting screw 15. A plate 16 is secured by means of screws 17 to the arm 14 and lies in the plate transverse to the axis of the shaft 13 and the plate 16 extends on each of the axes of the shaft 13.

The upper end of the plate 16, see Figure 1, has a slot 18 therethrough extending longitudinally of the plate.

A bolt 19 having a thumb screw 20 therein is projected through the slot 18 and through one end 21 of a connecting rod 22, the opposite end of which is pivotally mounted by means of a pin 23 to the arm 9. The bolt 19 may be moved along the slot 18 and set by means of the thumb screw 20 at any point desired, thereby varying the driving ratio between the worm gear 11 and the connecting rod 22.

From the foregoing description of the various parts of the device, the operation thereof will be readily understood. When first applied to a motor vehicle, it is necessary to adjust the bolt 19 in the slot 18 until the headlights 4 turn or rotate on their vertical axes simultaneous and in unison with the wheels of the vehicle.

As the worm gear 11 turns with the column 2, the worm wheel 12 will turn and cause rotated movement of the shaft 13. The plate 16 carried upon the shaft 13 by means of the arm 14 will rock upon its transverse axes and cause longitudinal movement of the connecting rod 22.

The headlights 4 will each move at the same time, and the beams therefrom will remain parallel by virtue of the connecting rod 8.

I claim:

A device for turning headlights comprising a pair of brackets, means for pivotally mounting said brackets upon the chassis of a motor vehicle, said brackets being constructed to support motor vehicle headlights, a connecting rod for connecting said brackets one with the other whereby movement of one of said brackets will cause similar movement of the opposite bracket, a shaft, means for rotating said shaft when the steering gear of said vehicle is operated, a plate carried by said shaft having a slot therethrough, a bolt projected through said slot, means for securing said bolt against movement relative to said slot at will, and a connecting rod pivotally connected with said bolt at one end and with one of said brackets at the opposite end, whereby actuation of said steering gear will cause simultaneous movement of said headlights.

WILLIAM MATHIAS THOMAS.